July 19, 1966  S. J. KEATING, JR  3,261,993
MHD WALL VORTEX GENERATION
Filed July 24, 1963  3 Sheets-Sheet 3

INVENTOR
STEPHEN J. KEATING JR.
BY Vernon F. Hauschild
ATTORNEY

United States Patent Office 3,261,993
Patented July 19, 1966

---

3,261,993
MHD WALL VORTEX GENERATION
Stephen J. Keating, Jr., East Hartford, Conn., assignor to United Aircraft Corporation, East Hartford, Conn., a corporation of Delaware
Filed July 24, 1963, Ser. No. 297,402
8 Claims. (Cl. 310—11)

This invention relates to magnetohydrodynamic generators and more particularly to apparatus and a method for aerodynamically reducing the boundary-layer voltage drop.

It has been found that an appreciable source of electrical loss in a magnetohydrodynamic generator is the voltage drop that occurs at the electrodes due to the boundary layer that flows over them.

It is an object of this invention to minimize the effect of the boundary layer over the electrodes of an MHD generator by establishing or inducing stream-wise boundary-layer vortices over the electrodes and thereby violently stirring hot, core-flow plasma with the cooler boundary layer, thus increasing its temperature and thereby its conductivity.

Established methods of boundary layer elimination, such as sucking off the boundary layer through the duct wall is of no utility in this instance because the hot plasma flowing at supersonic velocities through the MHD generator is of such a nature that it would take very complicated and hence very heavy apparatus to be able to receive and withstand the temperatures thereof. Similarly, the vane-type vortex generators taught in United States Patent No. 2,558,816 are ineffective because they project into the plasma stream thus establishing undesirable shock waves and are incapable of withstanding contact with the plasma and therefore are soon burned away. The shock waves disrupt the flow and are undesirable in themselves.

Similarly, the conventional "horseshoe" vortices have been made by projecting pin-like protrusions into a stream. This type of vortex generation as described by Gregory and Walker in their publication on "The Effect on Transition of Isolated Surface Excresences in the Boundary Layer," British ARC, FM 1482, Perf. 698, October 1950. Though effective in principle, the protrusions burn away due to the plasma heat and velocity and the vortices induce extremely high, destructive heating in the surface they contact.

It is therefore a further object of this invention to accomplish the generation of the desired vortices without establishing shock waves or high heat flux without the need of special complicated and expensive apparatus, and by the use of equipment which is capable of withstanding the temperatures and velocities of the plasma in an MHD generator.

Other objects and advantages will be apparent from the specification and claims and from the accompanying drawings which illustrate an embodiment of the invention.

FIG. 4 is a view from line 5—5 of FIG. 2.

Figure 1:
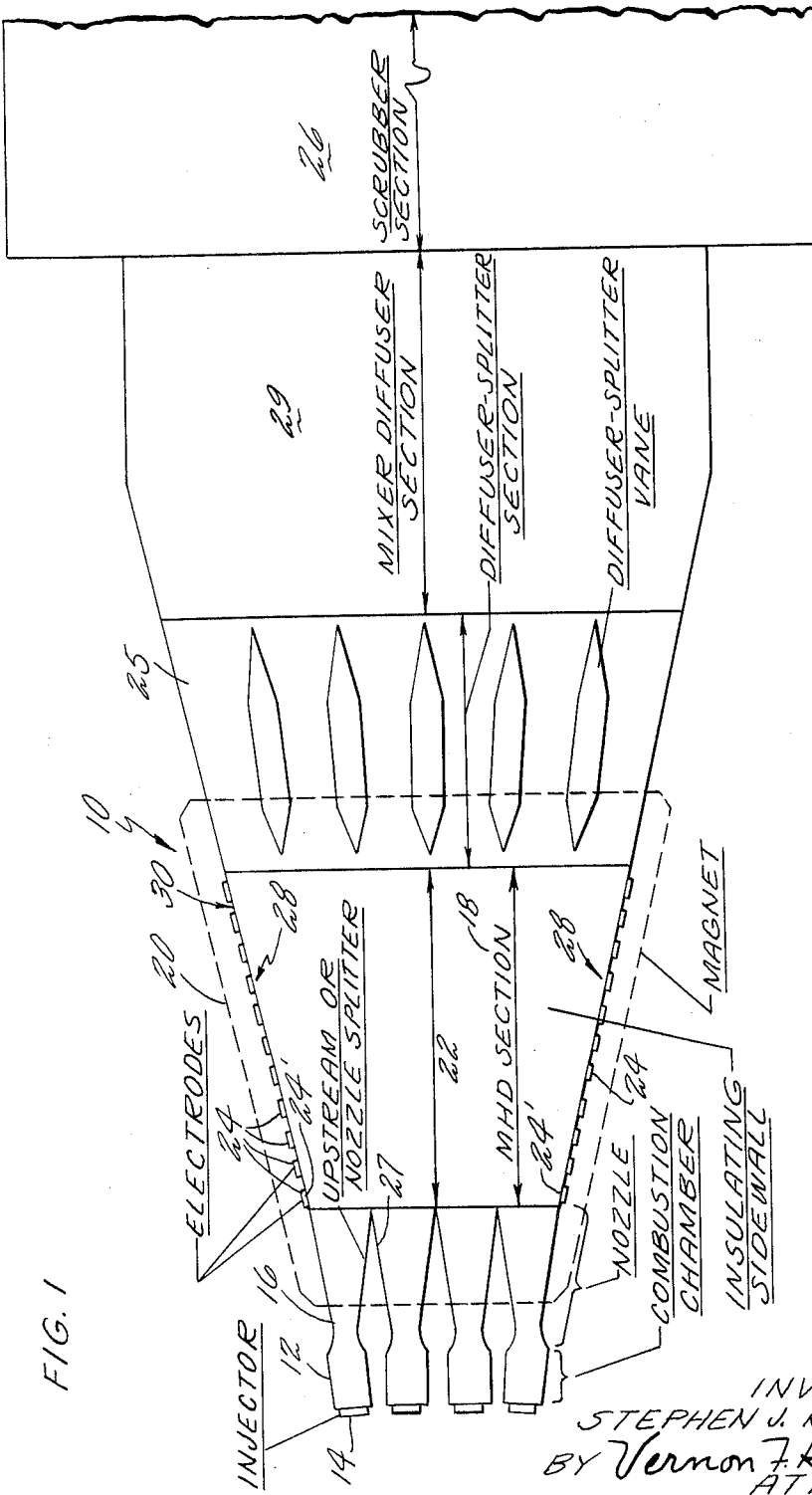
FIG. 1 is a schematic cross sectional view showing a typical MHD generator.

Referring to FIG. 1 we see a conventional MHD generator 10 which comprises preferably a plurality of combustion chambers 12 where a propellant is injected into the combustion chambers through injector 14 and the products of combustion are discharged therefrom through convergent-divergent nozzle 16 into the MHD generator duct 18, which is preferably rectangular in cross section. The purpose of the combustion chambers 12 is to induce a flow of high velocity, high temperature, electrically conductive gas called plasma, through the MHD duct 18. While certain propellants are known to produce such a gas due to normal combustion, it might be necessary to seed the combustion chamber products with a hydrous solution of potassium nitrate to attain the necessary degree of ionization or electrical conductivity.

Some o fthe thermal energy of the plasma is converted to kinetic energy by expanding it through convergent-divergent nozzle 16. The plasma flow from the nozzles through duct 18 is at a temperature of between 4,000 to 6,000° R., travels at a velocity of about 6,500 feet per second and induces a heat flux to the duct walls of 100–300 B.t.u. per square foot. Electromagnets 20 are positioned around duct 18 to establish a magnetic field perpendicular to axis 22 of duct 18 through which the plasma flows to establish electrical potential between the electrodes 24, which are positioned as parallel strips transverse to axis 22 in the walls of duct 18, on opposite sides thereof. By conventional electrical take-off from the electrodes, the electrical potential across electrodes 24 is used to produce electrical energy.

The plasma is discharged from the duct 18 into the diffuser-splitter section 25 whose twofold purpose is to convert the remaining kinetic energy of the supersonic plasma to pressure and to prevent losses due to electrical eddy currents otherwise present at the duct 18 ends.

Note that the nozzle tips, called nozzle splitters 27, also perform the function of inhibiting eddy currents with their attendant losses.

The plasma is hen discharged into the mixer-diffuser section 29 where the diffusion and pressure-recovery process on the now subsonic stream is completed. Water is injected in the mixer-diffuser section 29 to cool and de-ionize the plasma thus decreasing its electrical conductivity to prevent electrical losses to grounded structures downstream.

The plasma will eventually be discharged into scrubber section 26, where it will be further de-ionized by cooling to preclude electrical losses and will also be water-scrubbed so that toxic plasma is not indiscriminately discharged to atmosphere.

Experience has shown that a boundary layer forms along the wall of duct 18 and adjacent electrodes 24, thereby producing a voltage drop at the electrodes. This voltage drop, of course, means an electrical output loss and hence should be reduced or eliminated.

Our experiments show that inducing stream-wise vortices to flow over the electrodes will reduce or eliminate these boundary layer effects by violently stirring core-flow plasma into the boundary layer to increase its temperature and hence its electrical conductivity.

As described previously, the conventional methods of establishing stream-wise vortices are not practical in this instance because the vane and/or pin-type protrude into the plasma stream and will soon burn away due to the heat and velocity of the plasma. It has been found that by providing a selectively shaped ramp either in the duct wall forward of the electrodes or by providing electrodes with ramped-shaped inner surfaces, such stream-wise vortices, extending parallel to the direction of the plasma flow can be established across the faces of the electrodes to reduce or eliminate the aforementioned voltage drop due to boundary layer effects.

The mechanism by which these vortices are formed in incompressible flow is described by H. Gortler in the publication "On the Three-Dimensional Instability of Laminar Boundary Layers on Concave Walls," NACA TM–1375, 1954. Experimental evidence of the existence of these vortices in supersonic flow due to similar causes is presented by Hopkins, Keating, and Muhl in the publication "Forces and Pitching Moments on an Aspect-Ratio 3.1 Wing-Body Combination at Mach Numbers from 2.5 to 3.5 and Sublimation Studies of the Effect of Single Element Roughness on Boundary Layer Flow," NACA RM–A–58–E–21a, August 1958, and by Hopkins, Keating, and Bandettini in the publication "Photographic Evidence of Streamwise Arrays of Vortices in Boundary Layer Flow," NASA TN–D–328, September 1960.

Figure 2:
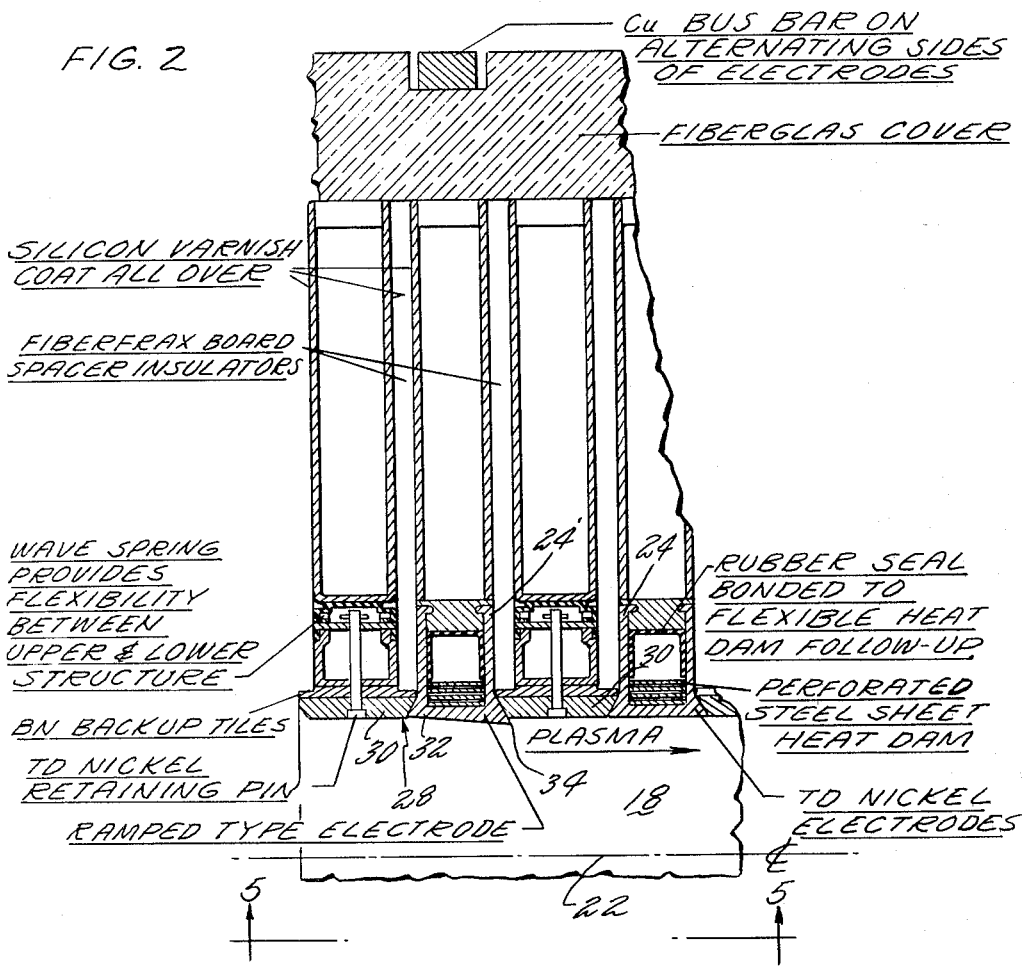
FIG. 2 is an enlarged cross sectional view showing a section of the electrode wall of an MHD generator and illustrating ramped electrodes and the electrically insulating spacers therebetween.

As best shown in FIG. 2, the wall 28 of duct 18 is formed in part by a series of electrodes 24 positioned between insulating spacers 30. The far left electrode, designated as 24', is a ramped electrode in that its forward-end or edge 32 is substantially flush with wall 28 while it smoothly protrudes downstream thereof into duct 18 progressively to its blunt after-end 34. Such a ramped electrode forms stream-wise vortices over electrodes 24 downstream thereof to reduce or eliminate the boundary layer and, hence, the voltage drop. It also produces such vortices and effects on its own surface. The ramped electrodes 24' may be repeated at intervals downstream.

Figure 3:
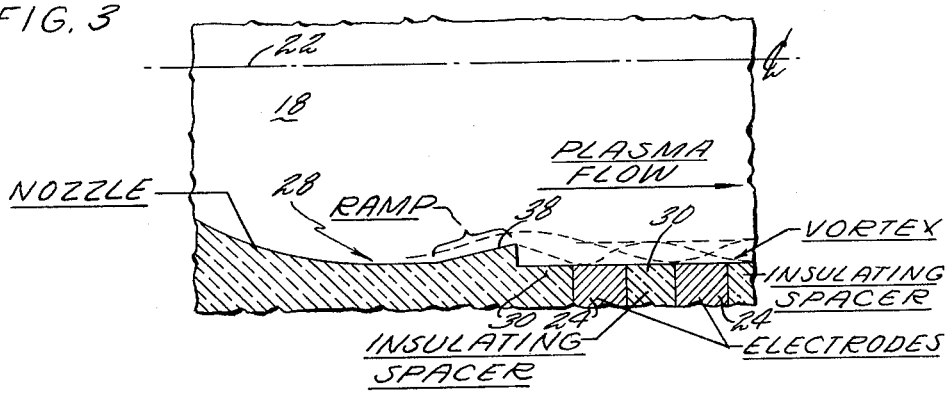
FIG. 3 is a schematic cross sectional view of an MHD generator illustrating a ramped duct wall producing stream-wise vortices over the electrodes.

As best shown in FIG. 3, duct 18 may be formed so that its wall 28 includes a ramp 38 upstream of the electrodes 24 and insulating spacers 30.

Figure 4:
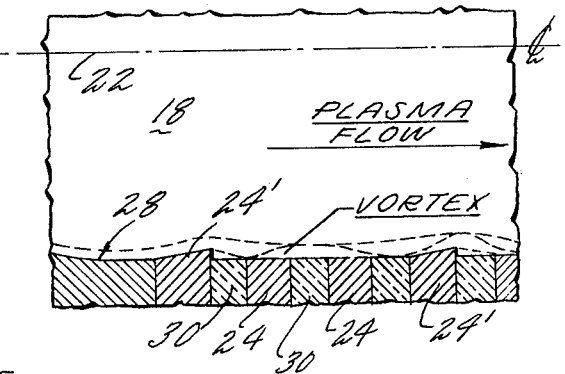
FIG. 4 is similar to FIG. 3 and illustrates the ramp in the electrodes only.
Figure 5:
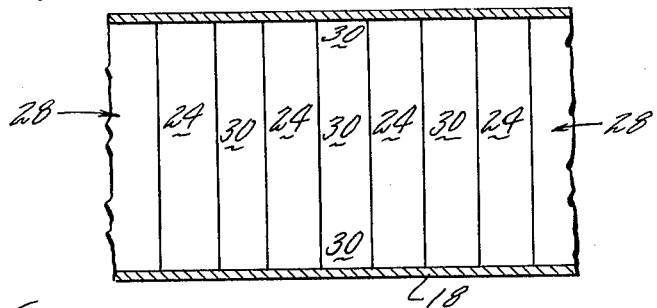

FIG. 4 illustrates a construction utilizing ramped electrodes 24' in the wall 28 of duct 18 without the use of a wall ramp such as 38 of FIG. 3.

Figure 6:
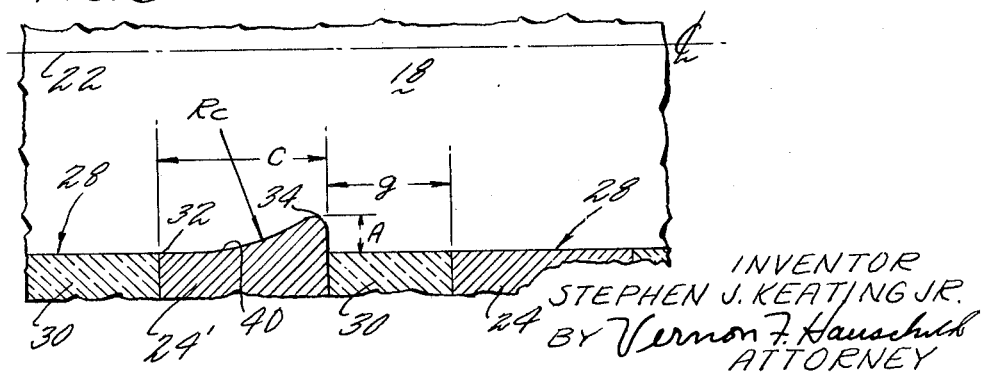
FIG. 6 is a sketch of a preferred embodiment of a ramp whether electrode or wall.

As best shown in FIG. 6, the ramp, whether an electrode 24' or the wall ramp 38 is preferably curved concave to the flow along surface 40, preferably to a selected radius of curvature ($R_c$) so as to be tangent to wall 28 at its forward end 32 and to be spaced inwardly from wall 28 between .050 and .100 inch at dimension A at its blunt downstream end 34, this latter dimension depending on duct 18 flow conditions, electrode location and electrode length. The upstream end 32 of ramped electrode 24' is purposely made tangent to the surface 28 or nearly so, so that it will not form undesirable shock waves in duct 18 as would be the case if it were not.

The curvature of surface 40 of ramped electrode 24' or of wall ramp 38 is preferably gentle enough to produce essentially isentropic compression of the plasma within duct 18 and thereby establish the stream-wise vortices illustrated in FIGS. 3 and 4 without establishing shock waves or other detrimental effects.

Spacers 30 and the remainder of wall 28 of duct 18 must perform the function of electrically insulating each electrode 24 from all other electrodes. Beryllium oxide (BeO) is a selected material to perform this function. Our electrodes 24 are preferably made of a refractory metal such as TD nickel to permit operation at high temperature.

For electrical reasons, it is important that the length $c$ of electrode 24 in an axial direction parallel to axis 22 bear a specified relation to the axial length $g$ of spacer 30. This is illustrated by the following approximate formula for the conditions present in the test and example generators:

$$\frac{c}{c+g} = 0.7$$

The reasons for this ratio are fully explained in UAC Research Report R–1852–2 by J. C. Crown, entitled "Analysis of Magneto Gas Dynamic Generators Having Segmented Electrodes and Anisotropic Conductivity."

The ramped electrode 24' or the wall ramp 38 depends for its operation on the interaction of the flow curvature with the boundary layer to provide high energy stream-wise boundary layer vortices whose axes are parallel to the plasma stream flow.

For further details regarding an MHD generator and one of the cycles which may be used in such a generator, attention is called to co-pending United States application Serial No. 248,532, filed December 31, 1962, on improvements in Two-Phase Fluid Power Generator With No Moving Parts, by John W. Larson, in which reference may be had.

It is to be understood that the invention is not limited to the specific embodiment herein illustrated and described but may be used in other ways without departure from its spirit as defined by the following claims.

I claim:

1. In a magnetohydrodynamic generator, a duct having an axis, means to establish a magnetic field across said duct substantially perpendicular to said axis, at least one electrode positioned in opposite walls of said duct, means to pass electrically charged fluid through said duct and hence across said magnetic field to establish an electrical potential between said electrodes, each of said electrodes at its inner side being substantially flush with the wall of said duct at the electrode upstream end and smoothly projecting progressively into said duct in a downstream direction to establish vortices along the walls of said duct and across all electrodes downstream thereof to reduce boundary-layer voltage drop.

2. Apparatus as in claim 1 wherein said electrodes are in two rows in opposite walls of said duct and including insulating spacers between each of said electrodes.

3. Apparatus as in claim 1 wherein each of said electrodes projects into said duct between about .050" and .100" at the electrode downstream end.

4. Apparatus as in claim 1 wherein each electrode is shaped to have a selected radius of curvature tangent with said duct wall at said electrode upstream end to terminate in a blunt surface at said electrode downstream end.

5. Apparatus as in claim 2 wherein the ratio of the axial dimension of each of said electrodes divided by the axial dimension of each of said electrodes plus one of said insulating spacers is approximately 0.7.

6. Apparatus as in claim 1 wherein said inner side of each of said electrodes is of concave curvature.

7. Apparatus as in claim 1 wherein said inner surface of each of said electrodes is shaped to produce substantially isentropic compression of the electrically charged fluid being passed thereover, thus minimizing production of shock waves.

8. In a magnetohydrodynamic generator, a duct having an axis and a duct wall, means to establish a magnetic field across said duct perpendicular to said axis, at least one electrode positioned in opposte walls of said duct, means to pass plasma through said duct and hence across said magnetic field to establish an electrical potential between said electrodes, a ramp positioned in said duct wall upstream of said electrodes and shaped to blend with said wall at the ramp forward end and to smoothly and progressively project into said duct and terminating in a blunt after end, said ramp being shaped to cause substantially isentropic compression of the plasma flowing thereover to establish stream-wise vortices downstream thereof and across said electrodes without, however, inducing excessively high heat flux to the electrode and duct wall.

References Cited by the Examiner

UNITED STATES PATENTS

| | | |
|---|---|---|
| 2,558,816 | 7/1951 | Bruynes. |
| 3,012,400 | 12/1961 | Corson _____ 60—39.74 X |
| 3,048,014 | 8/1962 | Schmidt _____ 60—37.74 X |
| 3,133,212 | 5/1964 | Szekely _____ 310—11 X |

MILTON O. HIRSHFIELD, *Primary Examiner.*

DAVID X. SLINEY, *Examiner.*